(12) United States Patent
Walker et al.

(10) Patent No.: US 11,066,256 B2
(45) Date of Patent: Jul. 20, 2021

(54) GRAIN BIN POWERSWEEP WITH SUMP SHAFT APERTURE SEALING COVER PLATE ASSEMBLY

(71) Applicant: CTB, Inc., Milford, IN (US)

(72) Inventors: Jeffrey E. Walker, Fort Wayne, IN (US); Adam K. Gutwein, Goshen, IN (US); Mark S. Dingeldein, Milford, IN (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 16/810,723

(22) Filed: Mar. 5, 2020

(65) Prior Publication Data

US 2020/0290827 A1 Sep. 17, 2020

Related U.S. Application Data

(60) Provisional application No. 62/818,323, filed on Mar. 14, 2019.

(51) Int. Cl.
| | |
|---|---|
| *B65G 65/46* | (2006.01) |
| *B65G 33/32* | (2006.01) |
| *B65G 33/10* | (2006.01) |

(52) U.S. Cl.
CPC .......... *B65G 65/466* (2013.01); *B65G 33/10* (2013.01); *B65G 33/32* (2013.01); *B65G 2201/042* (2013.01)

(58) Field of Classification Search
CPC .............. B65G 65/466; B65G 65/4836; B65G 65/463; B65G 33/34; B65G 33/10; B65G 33/18; B65G 33/32; B65G 33/08; B65G 53/48; A01F 25/20; A01F 25/2018
See application file for complete search history.

(56) References Cited

U.S. PATENT DOCUMENTS

| | | |
|---|---|---|
| 3,151,749 A | 10/1964 | Long |
| 4,063,654 A | 12/1977 | Shivvers |
| 4,220,433 A | 9/1980 | Feterl |
| 4,583,903 A * | 4/1986 | Hutchison ............ B65G 65/466 198/676 |

(Continued)

OTHER PUBLICATIONS

International Search Report and Written Opinion in corresponding International Application No. PCT/US2020/021862 dated Jul. 6, 2020.

*Primary Examiner* — Glenn F Myers
(74) *Attorney, Agent, or Firm* — Harness, Dickey & Pierce, P.L.C.

(57) ABSTRACT

An unload conveyor and a sweep conveyor can be positioned below and above a floor of the grain bin, respectively. A below floor gearbox and an above floor gearbox can be positioned below and above a sloped wall, respectively, of a sump. The sloped wall can be designed to shed grain toward a sump basin. A coupling shaft can extend through a non-circular sump shaft aperture in the sloped wall to couple the below floor gearbox to the above-floor gearbox. The coupling shaft can extend vertically. A pair of seal cover plates can form a horizontal wall extending perpendicular to the coupling shaft. The horizontal wall can have a circular sealing aperture therein and through which the coupling shaft extends. A washer can be provided adjacent the circular sealing aperture that can be free to move laterally with wobbling of the coupling shaft.

20 Claims, 8 Drawing Sheets

(56) References Cited

U.S. PATENT DOCUMENTS

| | | |
|---|---|---|
| 4,875,820 A | 10/1989 | Lepp et al. |
| 6,254,329 B1 | 7/2001 | Sukup et al. |
| 8,210,342 B2 | 7/2012 | Lepp et al. |
| 2010/0221090 A1* | 9/2010 | Amick ................. B65G 65/466 414/314 |
| 2017/0152110 A1* | 6/2017 | Rauser ................... B65G 33/34 |

* cited by examiner

GRAIN BIN POWERSWEEP WITH SUMP SHAFT APERTURE SEALING COVER PLATE ASSEMBLY

CROSS-REFERENCE TO RELATED APPLICATIONS

This application claims the benefit of U.S. Provisional Application No. 62/818,323, filed on Mar. 14, 2019. The above application is hereby incorporated herein in its entirety by reference.

FIELD

The present disclosure relates to powersweeps used in removing grains, such as wheat, oats, rye, barley, corn and rice from storage bins; and more particularly to sealing shaft apertures through the sump.

BACKGROUND

This section provides background information related to the present disclosure which is not necessarily prior art.

Typically, grain is evacuated from a grain bin in two distinct phases: a gravity unloading phase and a sweeping phase. During the first unloading phase, slide gates are opened within the sumps to clear material via gravity from inside the bin. The bin floor can be a perforated floor through which air passes to aerate the grain in the bin. A below floor unload conveying system is engaged that can move the grain from the sumps to the exterior of the bin. During this initial unloading phase, the above floor sweep conveyor of the powersweep is idle.

Once all material has been evacuated via gravity through the center and any intermediate sumps, the next phase is activated: the sweeping phase. During the sweeping phase, the above floor rotating sweep conveyor is used to pull material from the edges of the bin into the center sump so that the below floor unload conveying system can evacuate the grain to the exterior of the bin.

The head of the unload conveyor is the end near the center of the bin where material enters, and the tail of the unload conveyor is the end outside the bin to which the material is conveyed. The head of the above floor sweep conveyor of the powersweep is the end closest to the bin wall, and the tail of the above floor sweep conveyor is the end nearest the center of the bin at which the grain is transferred. A below floor gearbox is coupled to the head of the unload conveyor, and an above floor gearbox is coupled to the tail of the sweep conveyor of the powersweep. The below floor gearbox takes power from the unload conveyor and transfers it to the above floor gearbox to drive the above floor sweep conveyor. A coupling shaft extends vertically through an aperture in a sloped wall of the sump to transfer power between the two gearboxes.

Throughout the loading, storage, and unloading processes, all grain must be kept above the aeration floor to allow for passage of air underneath the floor and up through the grain pile to aerate and dry the grain. If grain is allowed underneath the floor at any point, it will not be properly aerated and can lead to spoilage of grain and possible damage to the grain bin foundation and flooring. The center sump can extend through an aperture in the floor with horizontal flanges over the adjacent bin aeration floor to provide grain sealing therebetween. The sweep center sump enables the grain to be withdrawn from the bin and unloaded. The sweep center sump must itself be sealed adequately to prevent any grain from passing through and underneath the aeration floor.

The most difficult area to seal is the coupling shaft between the gearboxes due to the relative angles involved and the fact that the coupling shaft must be able to rotate in order to power the above floor sweep auger. A removable sloped wall, cover, or floor of the sump is provided covering the under floor gearbox. This sloped covering floor is removable so that the under floor gearbox and related components underneath can be serviced, maintained, and replaced as necessary. This covering floor is sloped to facilitate grain continuing down into the basin of the sump where the under floor unload conveyer can convey the grain out of the grain bin.

Many existing designs use a rubber belting material that is wrapped at an angle around the coupling shaft to attempt to prevent grain leakage. The relative angle between the vertical shaft and the rubber seal resulting from the sloped covering floor through which the coupling shaft extends reduces the longevity of any resulting seal and can lead to grain spillage after repeated use.

Another existing design leaves the angled aperture in the sloped covering floor unsealed, exposing the lower gearbox to the grain, but then sealing underneath the lower gearbox where no extending rotating coupling shafts need to pass therethrough. Exposing the below floor gearbox to grain, however, can lead to increased wear requiring increased maintenance of the gearbox, decreased lifespan of the gearbox, or both.

An additional design exists which utilizes a section of rubber hose around the coupling shaft which in theory extends from the sloped covering floor to the bottom of the upper gearbox to prevent leakage. This design does not allow the lower gearbox to be maintained without cutting and replacing the rubber hose. In addition, the rubber hose does not seal adequately because it extends at an angle through the aperture, which allows grain to pass therebetween.

Some examples of powersweeps can be found in U.S. Pat. No. 8,210,342 issued to Lepp et al. on Jul. 3, 2012, and U.S. Pat. No. 6,254,329 issued to Sukup et al. on Jul. 3, 2001. The above referenced patents (and any other U.S. patents or patent publications identified herein) are incorporated herein by reference in their entirety.

SUMMARY

This section provides a general summary of the disclosure, and is not a comprehensive disclosure of its full scope or all of its features.

In accordance with one aspect of the present disclosure, a grain bin powersweep with a sump shaft aperture sealing cover plate assembly can include a grain bin sump having a sloped wall designed to shed grain toward a sump basin. An unload conveyor can be positioned below a floor of the grain bin and operable to move grain out of the sump basin. A sweep conveyor can be positioned above the floor of the grain bin and can be operable to move grain toward the sump basin. A below floor gearbox can be positioned below the sloped wall and can be operably coupled to the unload conveyor. An above floor gearbox can be positioned above the sloped wall and can be operably coupled to the sweep conveyor. A coupling shaft can extend through a non-circular sump shaft aperture in the sloped wall to couple the below floor gearbox to the above floor gearbox. The coupling shaft can extend vertically. A pair of seal cover plates can form a horizontal wall extending perpendicular to the coupling shaft. The horizontal wall can have a circular sealing aperture therein and through which the coupling shaft extends.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
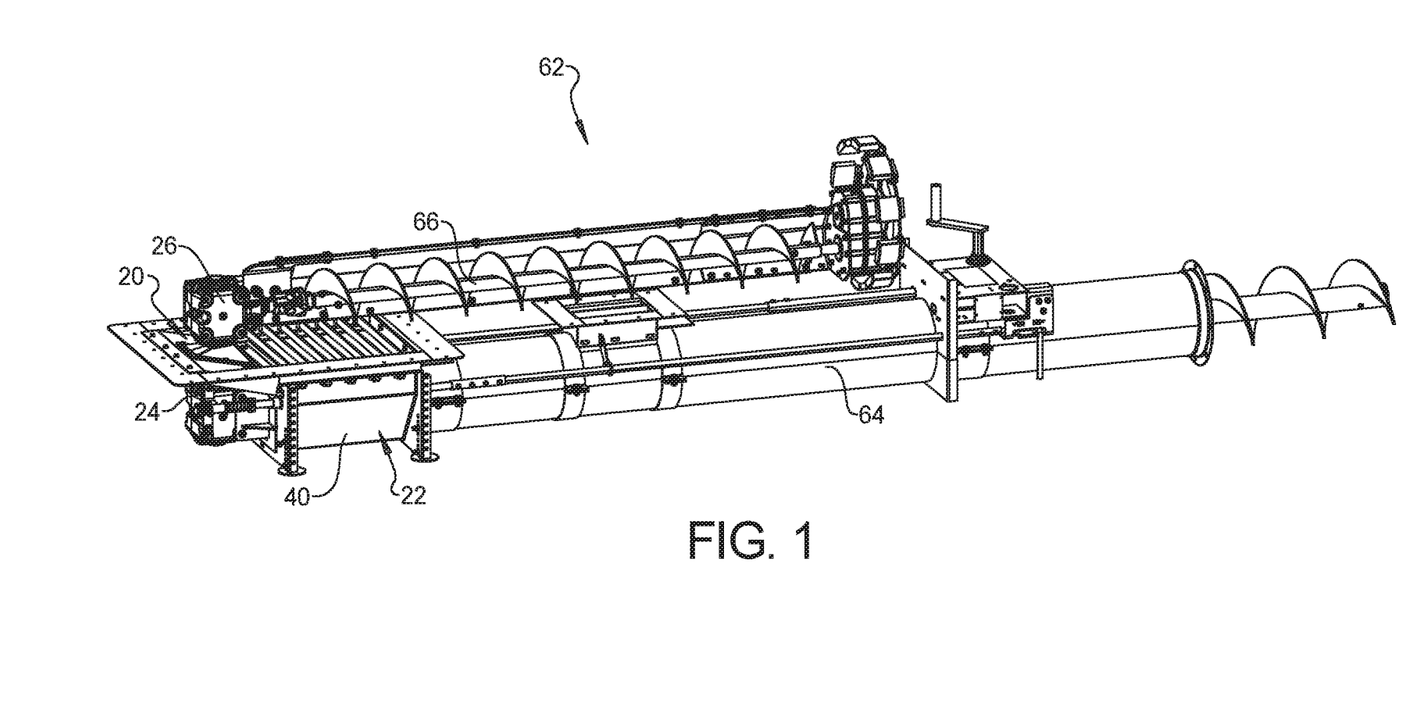
FIG. 1 is a perspective view of one example of a grain bin powersweep with a sump shaft aperture sealing cover plate assembly in accordance with the present invention.
Figure 2:
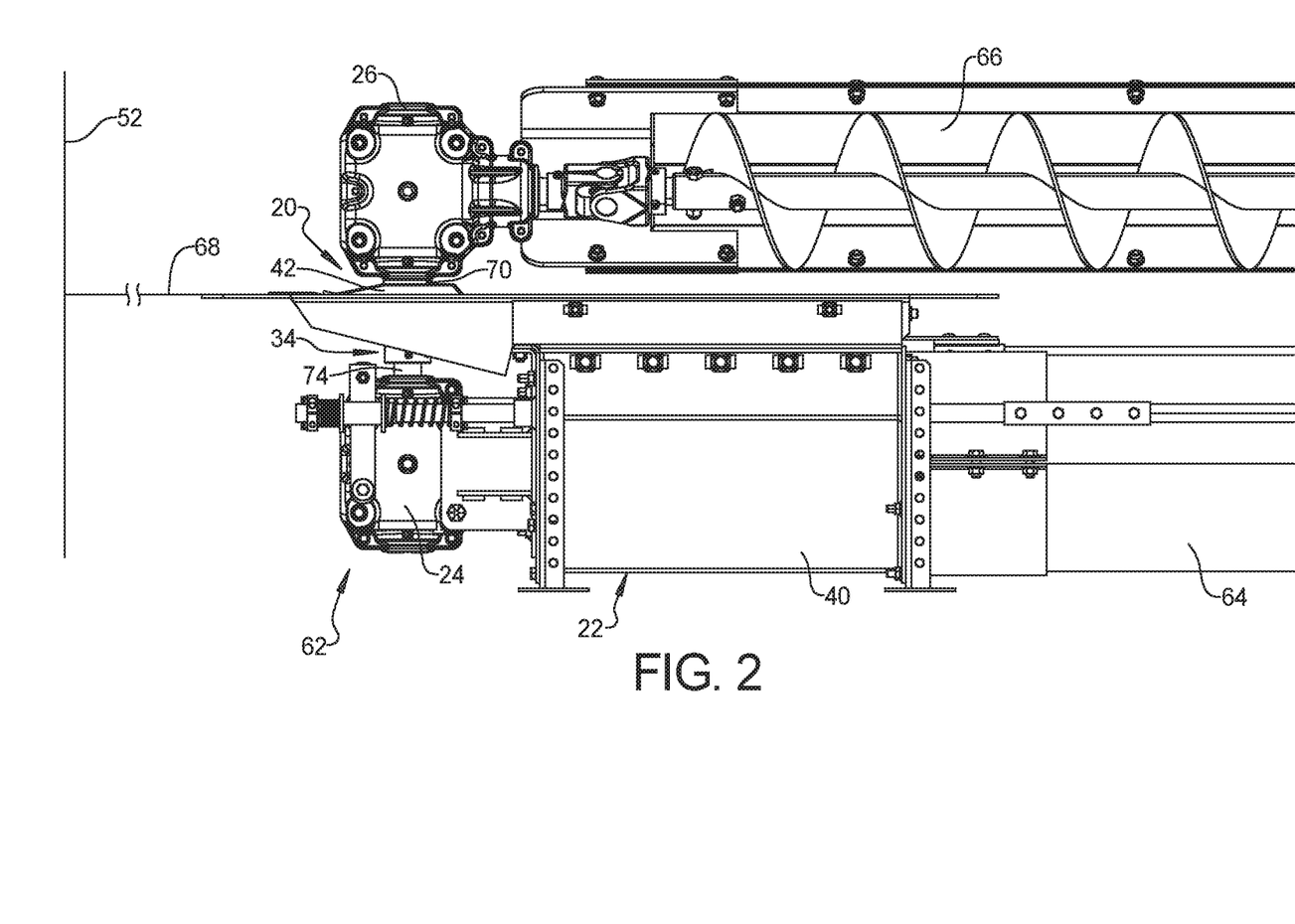
FIG. 2 is a fragmentary side elevation view of the powersweep of FIG. 1.
Figure 3:
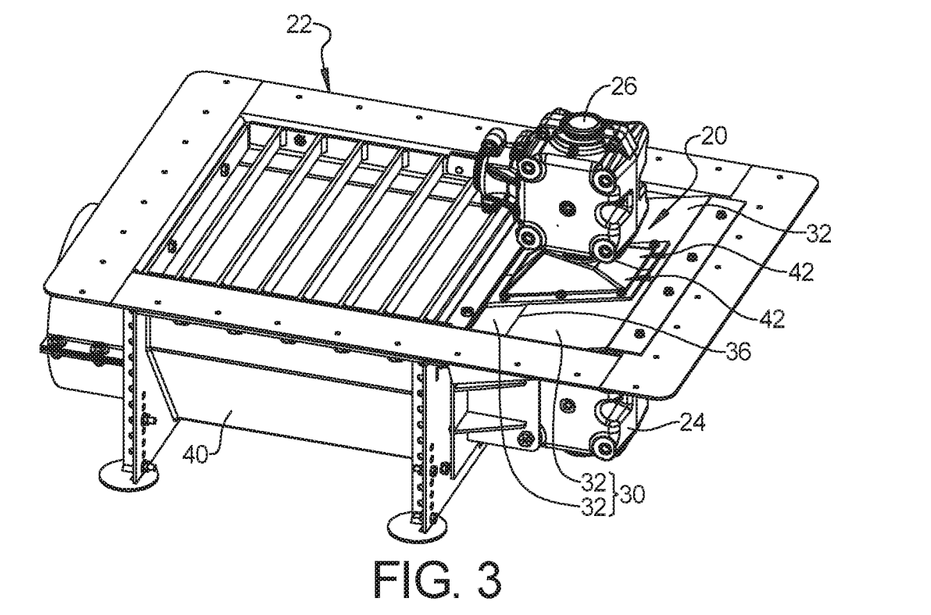
FIG. 3 is a perspective view of a center sump of the powersweep with the sump shaft aperture sealing cover plate assembly of FIG. 1.
Figure 4:
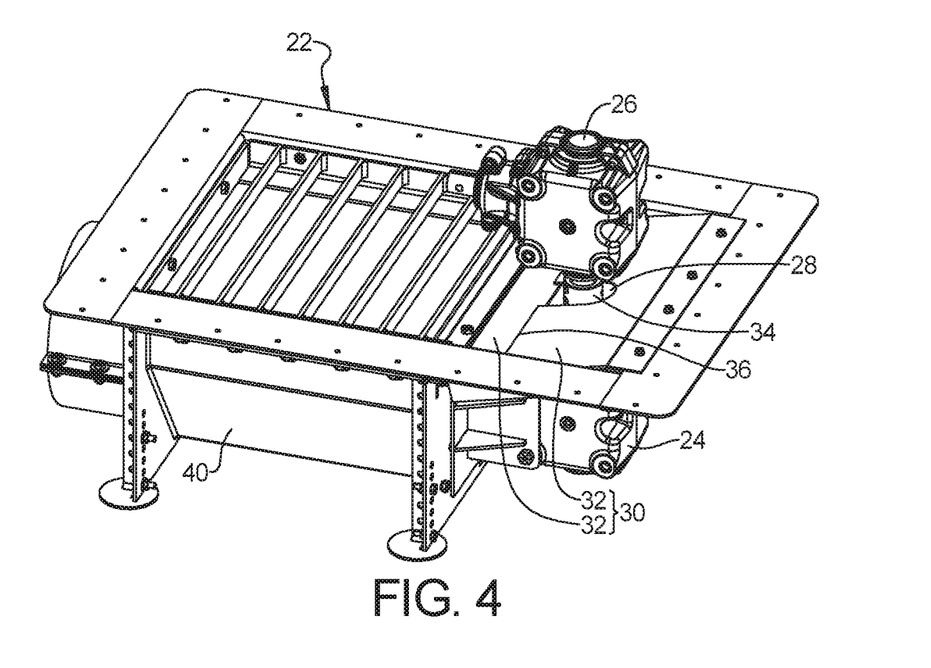
FIG. 4 is a perspective view similar to FIG. 3 showing the powersweep with the sump shaft aperture sealing cover plate assembly of FIG. 1 partially disassembled.
Figure 5:
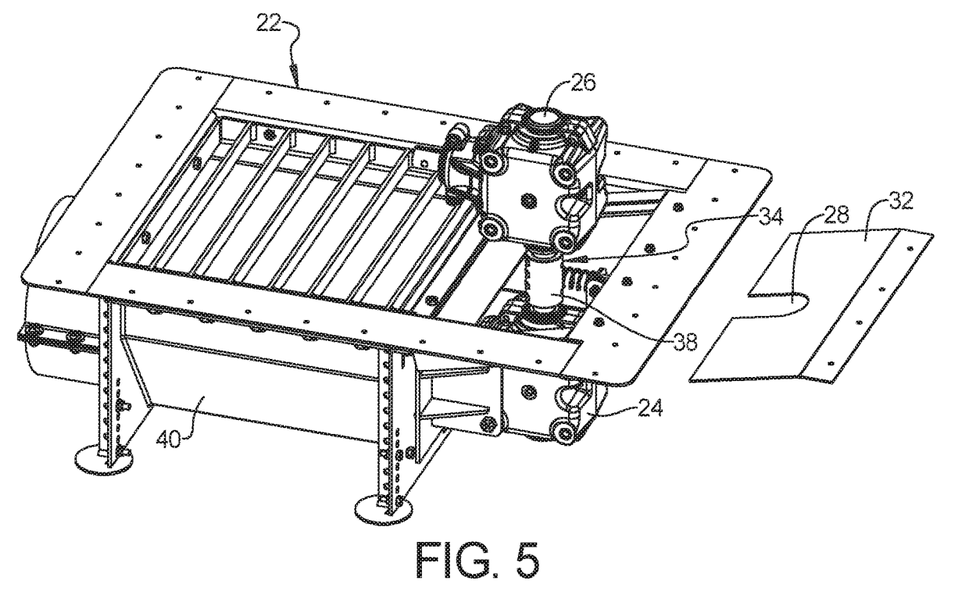
FIG. 5 is a perspective view similar to FIG. 4 showing the powersweep with the sump shaft aperture sealing cover plate assembly of FIG. 1 further disassembled.
Figure 6:
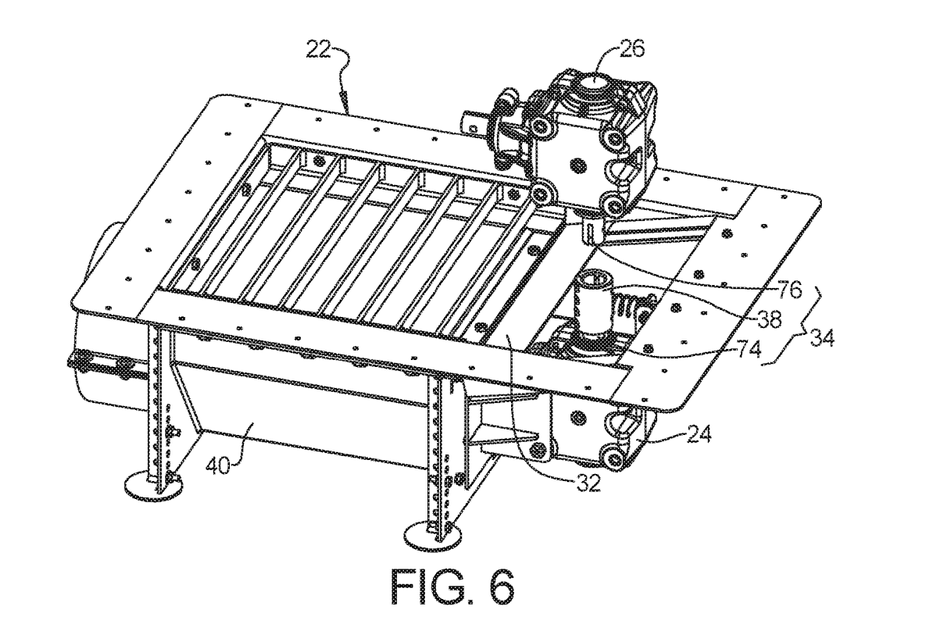
FIG. 6 is a perspectival view similar to FIG. 5 with the powersweep assembly further disassembled.
Figure 7:
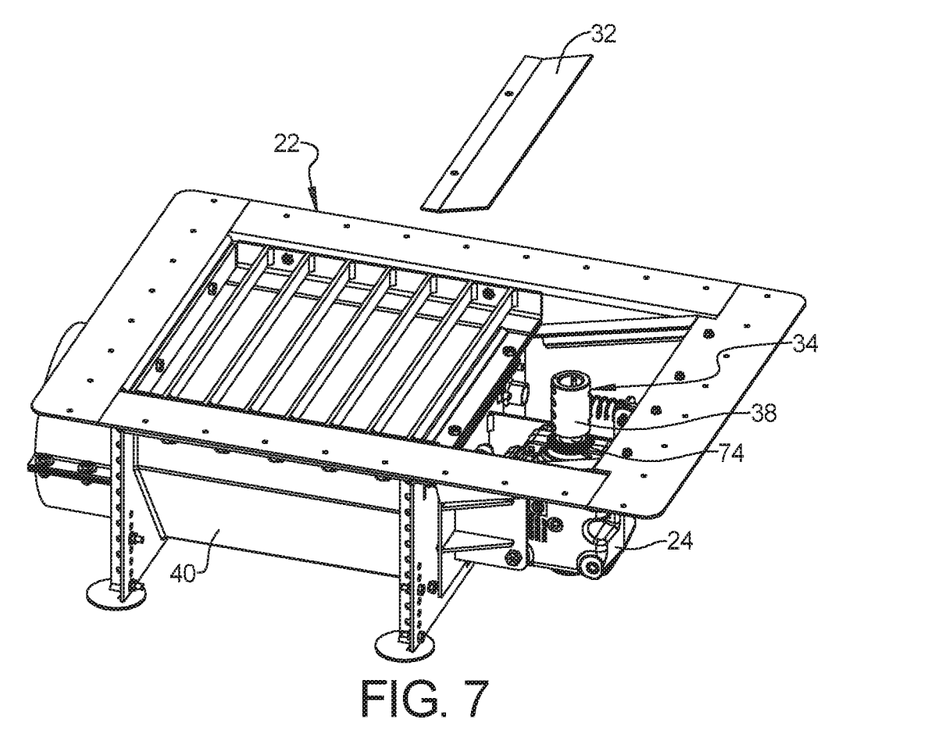
FIG. 7 is a perspectival view similar to FIG. 6 with the powersweep assembly further disassembled.
Figure 8:
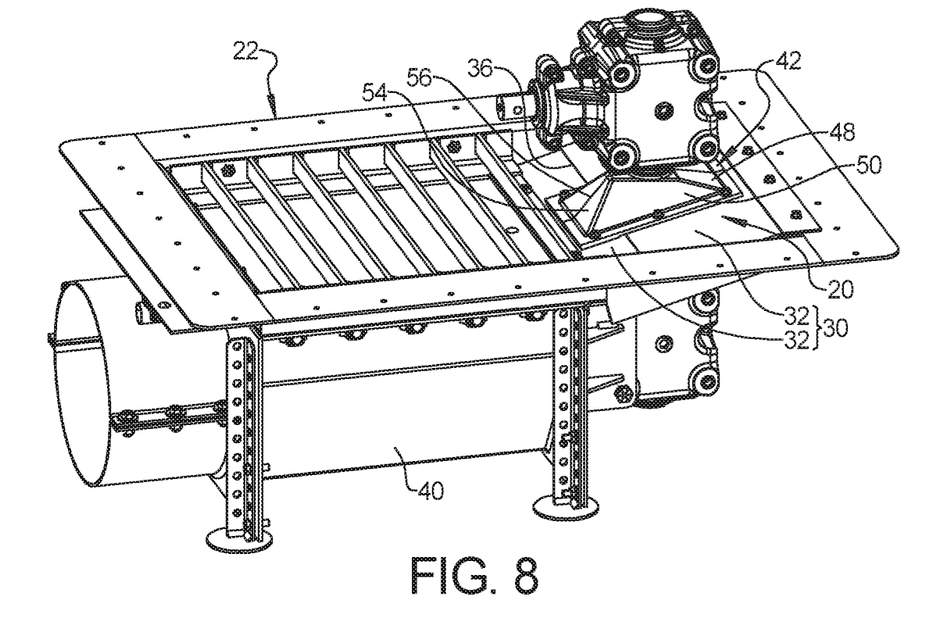
FIG. 8 is another perspective view of components of the powersweep of FIG. 1.
Figure 9:
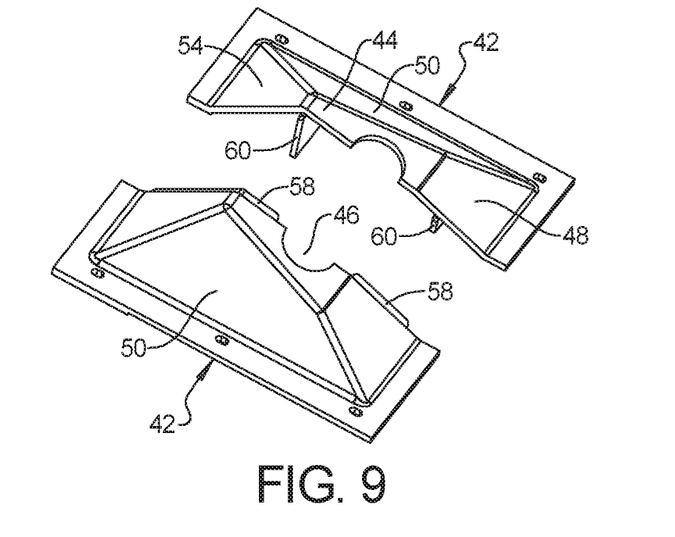
FIG. 9 is a perspective view of the cover plates of the powersweep of FIG. 1.
Figure 10:
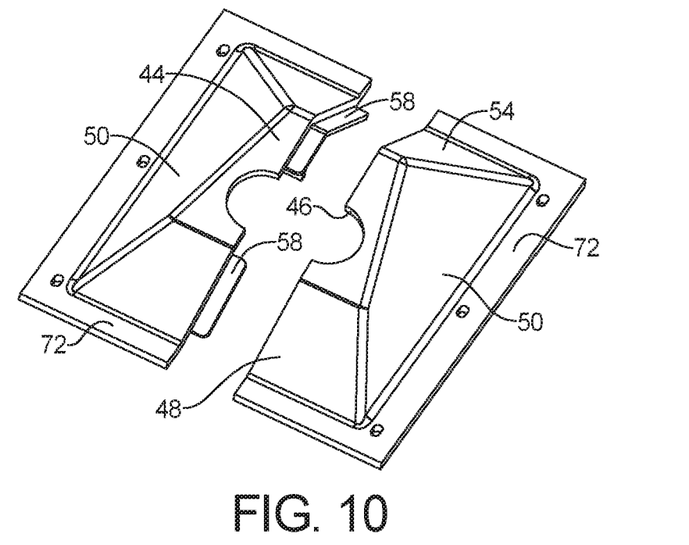
FIG. 10 is a perspective view of the cover plates of the powersweep of FIG. 1.
Figure 11:
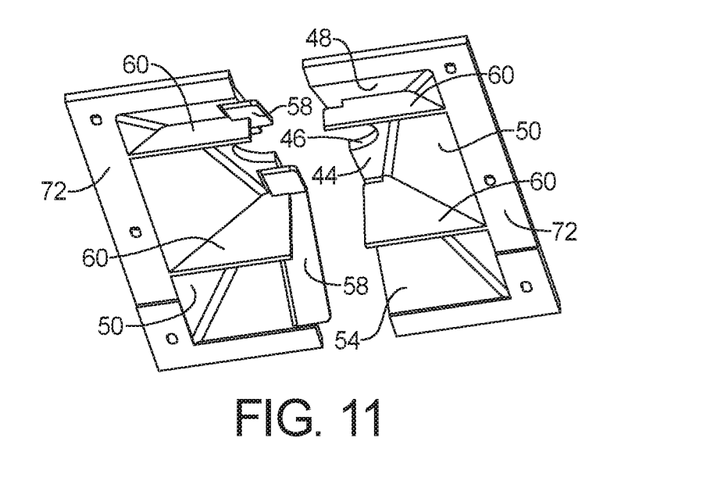
FIG. 11 is a perspective view of the cover plates of the powersweep of FIG. 1.
Figure 12:
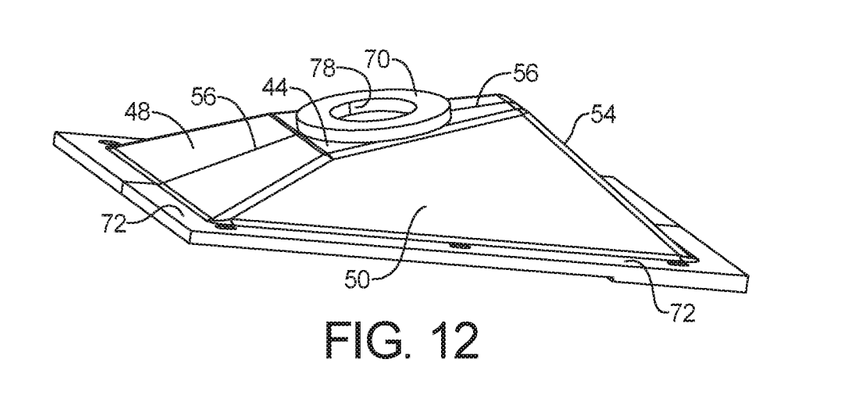
FIG. 12 is a perspective view of the cover plates and washer of the powersweep of FIG. 1.
Figure 13:
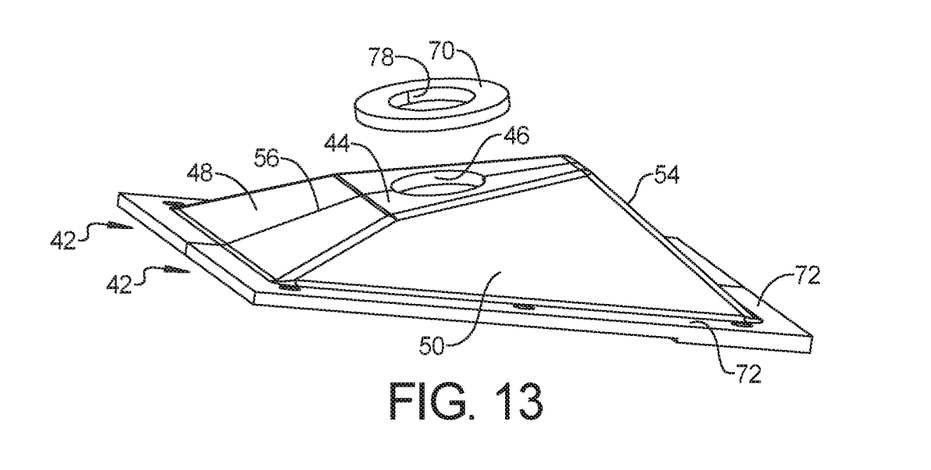
FIG. 13 is an exploded view of the cover plates and washer of the powersweep of FIG. 1.

With reference to FIGS. 1-13, one example embodiment of a powersweep 62, including a sump shaft aperture sealing cover plate assembly 20 in accordance with the present disclosure, is illustrated and described. As discussed above, a grain bin powersweep 62 includes an unload conveyor 64 below the bin floor 68 that moves grain from a center sump 22 to the exterior of the grain bin 52. A sweep conveyor 66 above the bin floor 68 rotates and moves grain into the center sump 22. A below floor gearbox 24 takes power from the below floor unload conveyor 64 and transfers it to an above floor gearbox 26, which in turn drives the above floor sweep conveyor 66. A coupling shaft 34 extends vertically through a sump shaft aperture 28 in a sloped wall 30 of the sump 22 to transfer power between the two gearboxes 24, 26.

In the illustrated example, the sump shaft aperture sealing cover plate assembly 20 can include two panels or plates 32 that together form the removable sloped wall, cover, or floor 30 of the sump 22, through which the coupling shaft aperture 28 is provided and the coupling shaft 34 extends. The two sump panels 32 can be joined at or near the shaft aperture 28 to facilitate their removal. The joint 36 can be provided by overlapping the bottom edge of the upper panel 32 with the upper edge of the lower panel 32. The joint 36 can extend in or along a first direction that can be perpendicular to the flow of grain down the sloped floor 30. These wall, cover, or floor panels or plates 32 can be made of metal and can be bolted in place.

The coupling shaft 34 that extends through the shaft aperture 28 typically includes a coupling 38 that joins the output shaft 74 of the under floor gearbox 24 to the input shaft 76 of the above floor gearbox 26. This shaft coupling 38 can be a tubular coupling that receives and is coupled to the distal ends of the gearbox shafts 74, 76. Thus, the coupling shaft 34 in this example includes such a coupling shaft assembly. The coupling shaft 34 and its axis of rotation is oriented substantially vertically.

As in the illustrated example, the coupling shaft aperture 28 can have an overall generally "U" or arched shape. As another example, the coupling shaft aperture 28 can have an oval or ellipsoid shape when viewed perpendicular to the surface of the wall 30 and plates 32. The non-circular shape of the coupling shaft aperture 28 occurs because the floor or wall 30 formed by the floor panels 32 does not extend substantially horizontally, but instead is sloped in order to shed grain down into the sump basin 40 where the under floor conveyor 64, such as the illustrated auger, can convey it out of the grain bin 52.

In addition, the cover plate assembly 20 can include a pair of seal cover plates 42 that together form a wall 44 extending in a plane that is substantially horizontal and perpendicular to the coupling shaft 34 and its axis of rotation, when the cover plates 42 are coupled to the sloped wall 30 or floor panels 32. A sealing aperture 46 is formed through this horizontal or perpendicular wall 44. As a result of the perpendicular orientation of this wall 44, the sealing aperture 46 can have a circular shape, and can have a corresponding diameter to that of the coupling shaft 34 extending through it. The perpendicular wall 44 can be the uppermost wall when coupled to the sloped wall 30 of the center sump 22. The dimensions of the perpendicular wall 44 can fit within the horizontal footprint of the above floor gearbox 26 over it throughout the rotation of the above floor gearbox 26 with the sweep conveyor 66.

Each of rear or upper end wall 48, the side walls 50, and the front or lower end wall 54 can be sloped (vertically, horizontally, or both) to help shed grain away from the sealing aperture 46 and sloped in the direction of the sump basin 40 where possible. The seal cover plates 42 can include interior reinforcing or support ribs 60 that can extend from the walls 44, 48, 50, 54 to the sloped floor panels 32 of the sloped wall 30 in order to provide sufficient structural support to resist the weight of the grain on the walls 44, 48, 50, 54. The seal cover plates 42 can be joined together at or near the sealing aperture 46 to facilitate their removal. The joint 56 between the cover plates 42 can extend in or along a second direction that can be perpendicular to the first direction, and can be parallel to the flow of grain down the sloped floor 30.

The seal cover plates 42 can include sealing tabs 58 that extend from one of the seal plates 42 across the joint 56 and overlap with an edge of the other seal plate 42 along the joint 56. Such sealing tabs 58 and resulting overlap can be provided along substantially the entirety of the joint 56. In the example, the tabs 58 extend along at least the joint 56 through the upper end wall 48 and lower end wall 54 and most of the perpendicular wall 44. The sealing tabs 58 can extend along the length of the joint 56 (either continuously or intermittently) sufficiently that the integrity of the joint 56 is maintained such that grain does not pass therethrough throughout operation of the grain bin 52 and of the powersweep 62.

The seal cover plates 42 can be somewhat flexible and can be made of molded material, such as thermoplastics or thermosetting materials. For example, the seal cover plates 42 can be made of Nylon reinforced with carbon fiber. The flexibility can allow the seal cover plates 42 to flex to accommodate any wobbling of the coupling shaft 34 as it rotates and as the above floor gearbox 26 rotates with the sweep conveyor 66. A single-piece molded component can form the seal cover plates 42, including the support ribs 60 and the sealing tabs 58.

In addition, the cover plate assembly 20 can include an annular ring or washer 70 mounted on the coupling shaft 34 between the perpendicular wall 44 of the seal cover plates 42 and the above floor gearbox 26. This can provide additional sealing of the coupling shaft aperture 28 and of the sealing aperture 46. For example, if the seal aperture 46 of the coupling plates 42 is or becomes larger or misshapen due to wobbling of the coupling shaft 34. As another example, the seal cover plates 42 may be less flexible and be designed with a slightly larger diameter than the coupling shaft 34 to accommodate its wobbling, and the annular ring or washer 70 can cover any resulting gap.

In some cases, the annular ring or washer 70 can be positioned adjacent the seal aperture 46 of the coupling plates 42 and supported so that the annular ring or washer 70 is free to move laterally or in a plane perpendicular to the coupling shaft 34 and its axis of rotation. Such free or unconstrained lateral movement can virtually eliminate any wear of the coupling shaft 34 against the central opening 78 of the washer 70 that would cause it to enlarge sufficiently enough that grain could find its way through the central opening 78 between the annular ring or washer 70 and the coupling shaft 34. This can be useful, for example, if the gap between the coupling shaft 34 and the seal aperture 46 of the coupling plates 42 is, or becomes, large enough for grain to pass through. The smaller gap between the coupling shaft 34 and the central opening 78 of the washer 70 would still prevent grain from being able to pass through the larger seal aperture 46 gap. The washer 70 can be made of a metal, such as bronze, of a plastic, such as nylon, combinations thereof, and many other materials.

The seal cover plates 42 can be bolted to the sloped wall 30 or panels 32 via the peripheral flange 72. Thus, the seal cover plates 42 can be easily removed and replaced similar to, and along with, the wall panels 32 of the sump 22 so that a user can access the components thereunder.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A grain bin powersweep with a sump shaft aperture sealing cover plate assembly comprising:
    a grain bin sump including a sloped wall designed to shed grain toward a sump basin;
    an unload conveyor positioned below a floor of the grain bin and operable to move grain out of the sump basin;
    a sweep conveyor positioned above the floor of the grain bin and operable to move grain toward the sump basin;
    a below floor gearbox positioned below the sloped wall and operably coupled to the unload conveyor;
    an above floor gearbox positioned above the sloped wall and operably coupled to the sweep conveyor;
    a coupling shaft extending through a non-circular sump shaft aperture in the sloped wall to couple the below floor gearbox to the above floor gearbox, the coupling shaft extending vertically;
    a pair of seal cover plates forming a horizontal wall extending perpendicular to the coupling shaft, the horizontal wall having a circular sealing aperture therein and through which the coupling shaft extends.

2. The grain bin powersweep with a sump shaft aperture sealing cover plate assembly of claim 1, wherein the horizontal wall is positioned and dimensioned to fit within a footprint of the above floor gearbox throughout the rotation of the above floor gearbox with the sweep conveyor.

3. The grain bin powersweep with a sump shaft aperture sealing cover plate assembly of claim 1, wherein the sloped wall of the grain bin sump comprises two panels joined together along a wall joint extending in a first direction, and the seal cover plates are joined together along a cover joint extending in a second direction that is perpendicular to the first direction.

4. The grain bin powersweep with a sump shaft aperture sealing cover plate assembly of claim 1, wherein the pair of seal cover plates form a front wall toward the sump basin and a pair of opposite side walls, with the front and side walls being angled outwardly and downwardly from the horizontal wall to shed grain toward the sloped wall of the grain bin sump.

5. The grain bin powersweep with a sump shaft aperture sealing cover plate assembly of claim 4, wherein the pair of seal cover plates form a rear wall away from the sump basin that is angled downwardly from the horizontal wall and designed to shed grain toward the sloped wall of the grain bin sump.

6. The grain bin powersweep with a sump shaft aperture sealing cover plate assembly of claim 4, wherein the seal cover plates include interior support ribs that extend from at least one of the horizontal, side and front walls to the sloped wall to transfer grain weight from the at least one of the horizontal, side and front walls to the sloped wall of the grain bin sump.

7. The grain bin powersweep with a sump shaft aperture sealing cover plate assembly of claim 1, wherein the seal cover plates are joined together along a cover joint and the at least one cover plate includes at least one sealing tab that extends across the cover joint.

8. The grain bin powersweep with a sump shaft aperture sealing cover plate assembly of claim 7, wherein the at least cover plate, including the at least one sealing tab, is formed of a molded material.

9. The grain bin powersweep with a sump shaft aperture sealing cover plate assembly of claim 7, wherein the at least one sealing tab extends across the cover joint in the horizontal wall.

10. The grain bin powersweep with a sump shaft aperture sealing cover plate assembly of claim 7, wherein the pair of seal cover plates form a front wall toward the sump basin that is angled outwardly and downwardly from the horizontal wall to shed grain toward the sloped wall of the grain bin sump, and wherein the at least one sealing tab extends across the cover joint in the front wall.

11. The grain bin powersweep with a sump shaft aperture sealing cover plate assembly of claim 7, wherein the pair of seal cover plates form a rear wall away from the sump basin that is angled downwardly from the horizontal wall and designed to shed grain toward the sloped wall of the grain bin sump, and wherein the at least one sealing tab extends across the cover joint in the rear wall.

12. The grain bin powersweep with a sump shaft aperture sealing cover plate assembly of claim 1, wherein a washer is positioned around the coupling shaft and between the horizontal wall and the above floor gearbox.

13. The grain bin powersweep with a sump shaft aperture sealing cover plate assembly of claim 1, wherein the seal cover plates include peripheral coupling flanges bolted to the sloped wall.

14. The grain bin powersweep with a sump shaft aperture sealing cover plate assembly of claim 1, wherein the pair of seal cover plates form a front wall toward the sump basin and a pair of opposite side walls with the front and side walls extending from the horizontal wall to the sloped wall of the grain bin sump.

15. The grain bin powersweep with a sump shaft aperture sealing cover plate assembly of claim 14, wherein peripheral flanges extend from each of the front and side walls at the sloped wall of the grain bin sump.

16. The grain bin powersweep with a sump shaft aperture sealing cover plate assembly of claim 14, wherein the pair of seal cover plates form a rear wall away from the sump basin, with the rear wall extending from the horizontal wall to the sloped wall of the grain bin sump.

17. The grain bin powersweep with a sump shaft aperture sealing cover plate assembly of claim 15, wherein peripheral flanges extend from each of the front, side, and rear walls at the sloped wall of the grain bin sump.

18. The grain bin powersweep with a sump shaft aperture sealing cover plate assembly of claim 1, wherein the pair of seal cover plates include interior support ribs that extend from the horizontal wall to the sloped wall to transfer grain weight from the horizontal wall to the sloped wall, and at least one sealing tab extending across a joint between the cover plates, and wherein a single-piece molded component forms each of the cover plates, including any interior support ribs and seal tabs thereof.

19. The grain bin powersweep with a sump shaft aperture sealing cover plate assembly of claim 1, wherein a washer is positioned around the coupling shaft and adjacent to the sealing aperture of the seal cover plates, and wherein the washer is free to move laterally with wobbling of the coupling shaft.

20. The grain bin powersweep with a sump shaft aperture sealing cover plate assembly of claim 1, wherein a washer is positioned around the coupling shaft and adjacent the sealing aperture of the seal cover plates, and wherein a gap between the coupling shaft and an edge of the sealing aperture of the seal cover plates is larger than a gap between the coupling shaft and an edge of a central aperture of the washer.

* * * * *